(12) United States Patent
Horie et al.

(10) Patent No.: US 12,397,327 B2
(45) Date of Patent: Aug. 26, 2025

(54) ULTRASONIC WASHER AND AUTOMATIC ANALYSIS DEVICE

(71) Applicant: Hitachi High-Tech Corporation, Tokyo (JP)

(72) Inventors: Yosuke Horie, Tokyo (JP); Manabu Ochi, Tokyo (JP); Katsuhiko Kimura, Tokyo (JP); Hiroyuki Takayama, Tokyo (JP); Kouhei Nonaka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 279 days.

(21) Appl. No.: 18/025,486

(22) PCT Filed: Jan. 28, 2021

(86) PCT No.: PCT/JP2021/003051
§ 371 (c)(1),
(2) Date: Mar. 9, 2023

(87) PCT Pub. No.: WO2022/070454
PCT Pub. Date: Apr. 7, 2022

(65) Prior Publication Data
US 2023/0321698 A1    Oct. 12, 2023

(30) Foreign Application Priority Data
Sep. 29, 2020  (JP) .................................. 2020-163148

(51) Int. Cl.
*B08B 3/12*   (2006.01)
*B06B 1/06*   (2006.01)
*G01N 35/10*  (2006.01)

(52) U.S. Cl.
CPC .............. *B08B 3/12* (2013.01); *B06B 1/0611* (2013.01); *G01N 35/1004* (2013.01); *B06B 2201/71* (2013.01)

(58) Field of Classification Search
CPC ..... B08B 3/044; B08B 3/12; B08B 2209/005; G01N 35/1004; B06B 2201/71
See application file for complete search history.

(56) References Cited

U.S. PATENT DOCUMENTS

| 2018/0161829 A1 | 6/2018 | Horie et al. |
| 2019/0366391 A1 | 12/2019 | Horie et al. |
| 2019/0369132 A1 | 12/2019 | Nonaka et al. |

FOREIGN PATENT DOCUMENTS

| JP | 60-42635 A | 3/1985 |
| JP | 2018-100871 A | 6/2018 |

(Continued)

OTHER PUBLICATIONS

International Search Report (PCT/ISA/210) issued in PCT Application No. PCT/JP2021/003051 dated Mar. 30, 2021 with English translation (four (4) pages).

(Continued)

*Primary Examiner* — David G Cormier
(74) *Attorney, Agent, or Firm* — Crowell & Moring LLP (57) ABSTRACT

The present invention provides an ultrasonic washer that radiates ultrasonic waves from a plurality of vibration surfaces, radiates ultrasonic waves at the same phase, effectively generates cavitation around a nozzle through ultrasonic vibration, and has a high washing effect. The ultrasonic washer of the present invention is characterized by having: a washing tank in which is washed a nozzle that suctions a sample or reagent; and an ultrasonic vibrator having a piezoelectric element sandwiched between a front mass and a back mass, wherein a diaphragm between opposing upper and lower plates is formed at a leading end (Continued)

of the front mass installed at a leading end of the ultrasonic vibrator, and the nozzle is ultrasonically washed in a region between the upper plate and the lower plate.

11 Claims, 10 Drawing Sheets

(56) References Cited

FOREIGN PATENT DOCUMENTS

| | | |
|---|---|---|
| JP | 2020-514707 A | 5/2020 |
| WO | WO 2017/002740 A1 | 1/2017 |

OTHER PUBLICATIONS

Japanese-language Written Opinion (PCT/ISA/237) issued in PCT Application No. PCT/JP2021/003051 dated Mar. 30, 2021 (four (4) pages).
Japanese-language International Preliminary Report on Patentability (PCT/IPEA/409) issued in PCT Application No. PCT/JP2021/003051 dated Jun. 24, 2021, including Annexes with partial English translation (14 pages).

(A-A CROSS-SECTION)

ULTRASONIC WASHER AND AUTOMATIC ANALYSIS DEVICE

TECHNICAL FIELD

The present invention relates to an automatic analysis device that analyzes the components of a sample by mixing the sample with a reagent, and particularly to an ultrasonic washer and an automatic analysis device that wash nozzles for sample dispensing.

BACKGROUND ART

Since the automatic analysis device uses the same nozzle repeatedly for dispensing samples, it is necessary to perform nozzle washing of washing the leading end of the nozzle with a stream of water before sucking another sample.

However, since an automatic analysis device with high throughput performance dispenses samples at high speed, sufficient time cannot be used for nozzle washing.

For this reason, contaminants derived from the components of the sample may accumulate on the leading end of the nozzle. Accumulation of contaminants on the leading end of the nozzle may cause variations in the amount dispensed and carryover that brings the previous sample into the next sample, and there is a risk that the analysis accuracy may deteriorate.

As a background art in such a technical field, there is WO2017/002740A (PTL 1). PTL 1 describes an ultrasonic washer in which a vibrating unit that magnifies the ultrasonic vibration of a BLT (Bolt Clamped Langevin Transducer) is provided on the side of the inside of a washing tank, and by driving the BLT, cavitation through ultrasonic vibrations is uniformly generated around the nozzles in the washing liquid supplied to the inside of the washing tank and the nozzles are washed effectively (see Abstract).

CITATION LIST

Patent Literature

PTL 1: WO2017/002740A

SUMMARY OF INVENTION

Technical Problem

In general, in an ultrasonic washer, cavitation (a phenomenon in which bubbles are generated and disappear due to a pressure difference occurring in the liquid) becomes stronger in a region where the sound pressure is high, resulting in a high washing effect.

In order to increase the sound pressure, there are methods such as a method of amplifying the vibration of the vibration surface that radiates ultrasonic waves (generates ultrasonic vibration), and a method of irradiating the same region with ultrasonic waves from a plurality of vibration surfaces. In particular, in the case of the method of radiating ultrasonic waves from a plurality of vibration surfaces, it is necessary to radiate the ultrasonic waves at the same phase in order to increase the sound pressure.

PTL 1 describes an ultrasonic washer that uses ultrasonic vibrations of BLT to generate cavitation through ultrasonic vibrations to wash a nozzle.

However, PTL 1 does not describe an ultrasonic washer that radiates ultrasonic waves from a plurality of vibration surfaces, and radiates ultrasonic waves at the same phase in order to increase the sound pressure.

Therefore, the present invention provides an ultrasonic washer and an automatic analysis device that radiate ultrasonic waves from a plurality of vibration surfaces, radiate ultrasonic waves at the same phase, effectively generate cavitation around a nozzle through ultrasonic vibrations, and have a high washing effect.

Solution to Problem

In order to solve the above-described problems, the ultrasonic washer of the present invention is characterized by having a washing tank for washing a nozzle for sucking a sample or a reagent, and an ultrasonic vibrator having a piezoelectric element sandwiched between a front mass and a back mass, in which diaphragms of an upper plate and a lower plate facing each other are formed at a leading end of the front mass installed at a leading end of the ultrasonic vibrator, and the nozzle is ultrasonically washed and the drive frequency of the ultrasonic vibrator is set between the resonance frequency of the upper plate and the resonance frequency of the lower plate.

Further, an automatic analysis device of the present invention is characterized by having the ultrasonic washer of the present invention.

Advantageous Effects of Invention

According to the present invention, it is possible to provide an ultrasonic washer and an automatic analysis device that radiate ultrasonic waves from a plurality of vibration surfaces, radiate ultrasonic waves at the same phase, effectively generate cavitation around a nozzle through ultrasonic vibration, and have a high washing effect.

Problems, configurations, and effects other than those described above will be clarified by the description of the embodiments below.

BRIEF DESCRIPTION OF DRAWINGS

FIGS. 4A to 4C are explanatory diagrams illustrating a frequency response of the ultrasonic vibrator 201 and two diaphragms, where FIG. 4A shows when the resonance frequency of the ultrasonic vibrator 201 is the highest, FIG. 4B shows when the resonance frequency of the ultrasonic vibrator 201 is the lowest, and FIG. 4C shows a relationship between the resonance frequency of the ultrasonic vibrator 201 and the resonance frequencies of the two diaphragms, described in the first embodiment.

FIGS. 6A to 6C are explanatory diagrams illustrating an ultrasonic washer 26 described in an eighth embodiment, where FIG. 6A is a perspective view, FIG. 6B is a cross-sectional view, and FIG. 6C is a top view.

DESCRIPTION OF EMBODIMENTS

Embodiments of the present invention will be described below with reference to the drawings. Substantially the same or similar configurations are denoted by the same reference numerals, and the description may be omitted if the description is redundant.

First Embodiment

First, the automatic analysis device 10 having the ultrasonic washer 26 described in the first embodiment will be described.

Figure 1:
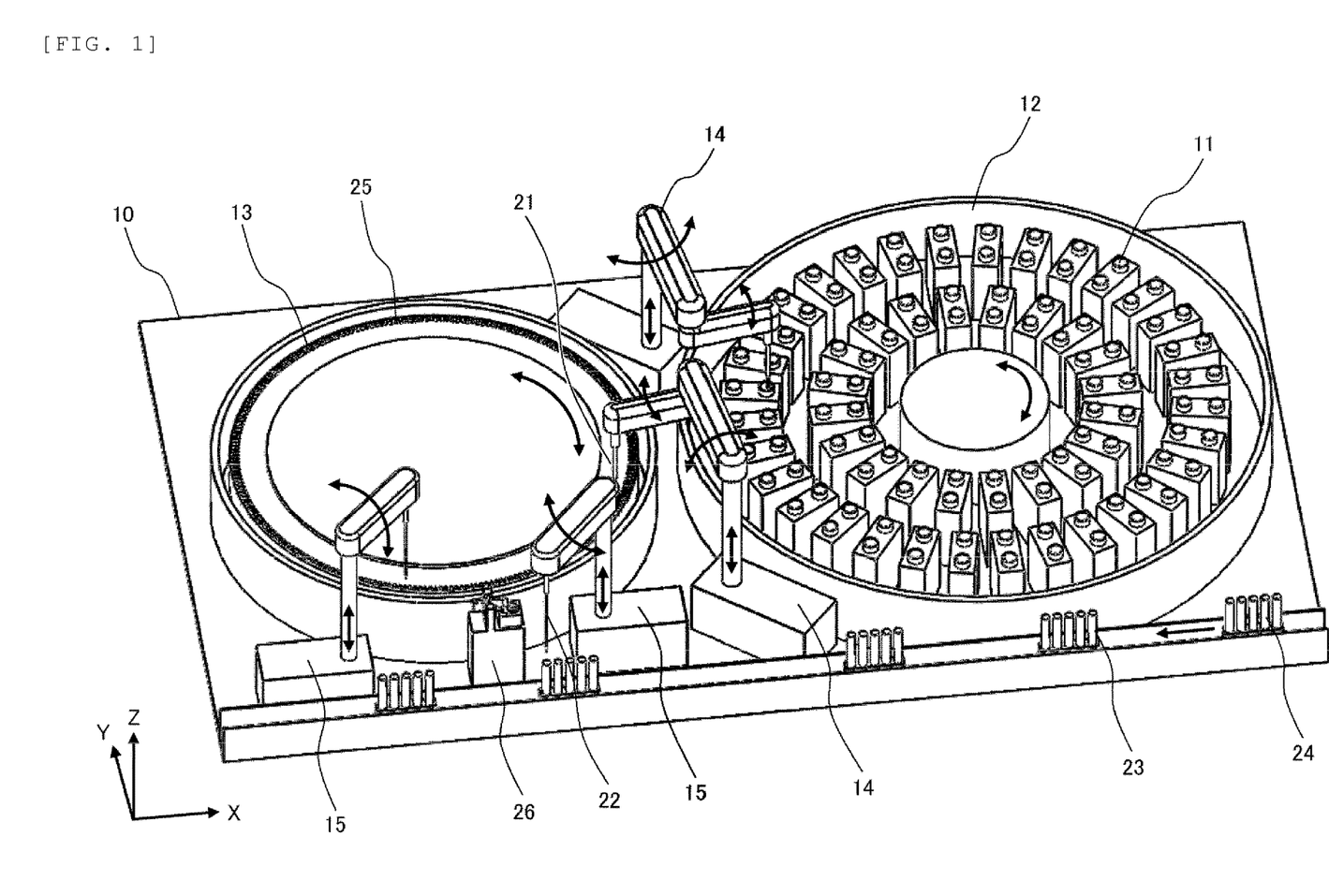
FIG. 1 is an explanatory diagram illustrating an automatic analysis device 10 having an ultrasonic washer 26 described in a first embodiment.

FIG. 1 is an explanatory diagram illustrating the automatic analysis device 10 having the ultrasonic washer 26 described in the first embodiment.

The automatic analysis device 10 analyzes the components of a sample by mixing the sample (specimen) and a reagent. The automatic analysis device 10 includes a reagent disk 12 to be loaded with a plurality of reagent containers 11, a reaction disk 13 for mixing and reacting reagents and samples, a reagent dispensing mechanism 14 for sucking and discharging reagents, and a sample dispensing mechanism 15 for sucking and discharging the sample.

The reagent dispensing mechanism 14 has a reagent nozzle 21 for dispensing a reagent.

The sample dispensing mechanism 15 has a sample nozzle 22 for dispensing the sample.

In the first embodiment, the automatic analysis device 10 has an ultrasonic washer 26 that ultrasonically washes the leading end of the sample nozzle 22. The automatic analysis device 10 may have an ultrasonic washer for ultrasonically washing the leading end of the reagent nozzle 21.

In other words, since the automatic analysis device 10 repeatedly uses the same sample nozzle 22 to dispense the sample, the ultrasonic washer 26 generally performs nozzle washing of washing the leading end of the sample nozzle 22 with a stream of water before sucking another sample.

A sample to be put into the automatic analysis device 10 is placed in a sample container (test tube or blood collection tube) 23, loaded on a sample rack 24, and conveyed. A plurality of sample containers 23 are mounted on the sample rack 24. The sample is blood-derived such as serum or whole blood, urine, or the like.

The sample dispensing mechanism 15 also moves (operates) the sample nozzle 22 to a suction position where the sample is sucked from the sample container 23, a discharge position where the sample is discharged to a cell 25, and moves (operates) the sample nozzle 22 to an ultrasonic washing position where the ultrasonic washer 26 that washes the leading end of the sample nozzle 22 is installed and a washing position where a washing tank (not shown) for washing the leading end of the sample nozzle 22 with a stream of water is installed.

The cells 25 are divided into a plurality of cells in the circumferential direction of the reaction disk 13 and installed.

Furthermore, the sample dispensing mechanism 15 adjusts the height of the sample container 23, the cell 25, or the ultrasonic washer 26 (washing tank) at the suction position, the discharge position, and the washing position and lowers (operates) the sample nozzle 22.

In order to perform such an operation, the sample dispensing mechanism 15 rotates the sample nozzle 22 to each position (the suction position, the discharge position, and the washing position) and vertically moves it at each position.

The sample dispensing mechanism 15 is controlled by a drive controller (not shown).

Also, the automatic analysis device 10 has a measuring unit (not shown). Then, the automatic analysis device 10 analyzes (photometrically) the liquid mixture containing the sample and the reagent contained in the cell 25 by the measuring unit. In other words, the automatic analysis device 10 analyzes the concentration of a predetermined component of the sample and analyzes the components of the sample. In addition, the measuring unit has, for example, a light source and a photometer, and the photometer is, for example, an absorption photometer or a scattering photometer.

The ultrasonic washer 26 ultrasonically washes the leading end of the sample nozzle 22 in contact with the sample.

The timing for ultrasonically washing the leading end of the sample nozzle 22 is immediately after the sample dispensing mechanism 15 discharges the sample, after the sample dispensing mechanism 15 finishes dispensing a certain number of times, during the daily first or last maintenance period of the automatic analysis device 10, or when the automatic analysis device 10 is out of service. The ultrasonic washer 26 is controlled by a drive controller (not shown).

Further, the automatic analysis device 10 may be required to have high throughput performance. In order to dispense a sample at high speed, it is necessary to suck, discharge, and wash the sample in a short time of several seconds during the analysis process. Therefore, it may not be possible to use sufficient time for nozzle washing. In other words, if ultrasonic washing is performed during one cycle of operations (sample suction, discharge, and washing), the throughput performance may be lowered.

Therefore, it is preferable to perform ultrasonic washing according to the type of analysis. In some cases, one type of sample is analyzed by a plurality of analysis devices (for example, low-sensitivity analysis is performed first, followed by high-sensitivity analysis). In such a case, a sequence that improves the overall throughput performance is adopted by performing ultrasonic washing on samples for high-sensitivity analysis and not performing ultrasonic washing when only performing low-sensitivity analysis.

Thus, during the analysis process, ultrasonic washing is performed when a sample analyzed by one measuring unit may be analyzed by another measuring unit, particularly when carryover of sample components from the previous analysis significantly affects the subsequent analysis. This can improve the overall throughput performance. In this case, one washing time is about several seconds.

Also, even at timings other than during analysis process, in order to respond to urgent analysis requests, the automatic analysis device 10 needs to transition to an analysis-ready state in a short period of time and the nozzle washing for a long time of one minute or more is not possible.

As described above, the automatic analysis device 10 requires the ultrasonic washer 26 that efficiently washes the nozzles in a short period of time. In other words, the automatic analysis device 10 requires the ultrasonic washer 26 that effectively generates cavitation around the sample nozzle 22 through ultrasonic vibration and has a high washing effect.

Next, the ultrasonic washer 26 described in the first embodiment will be described.

Figure 2A:
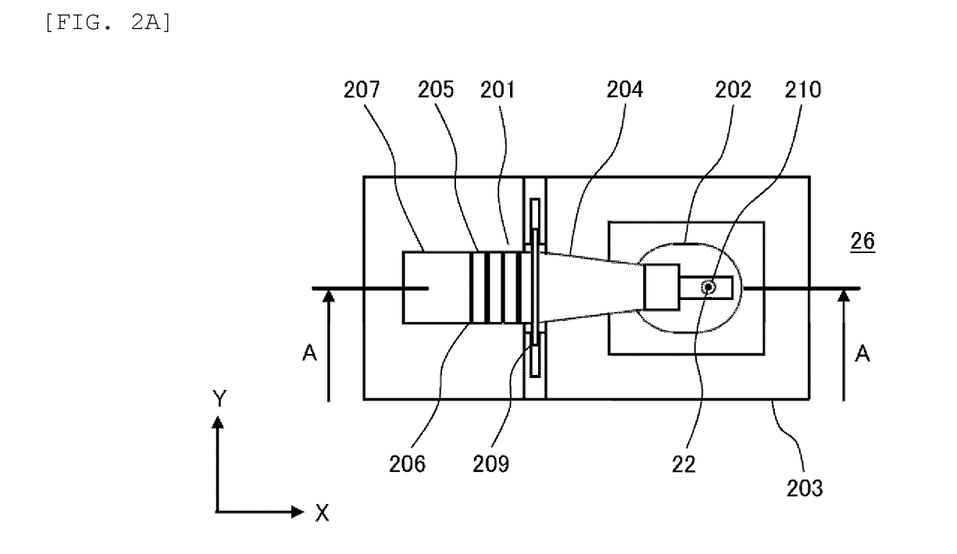
FIG. 2A is a top view illustrating the ultrasonic washer 26 described in the first embodiment.
Figure 2B:
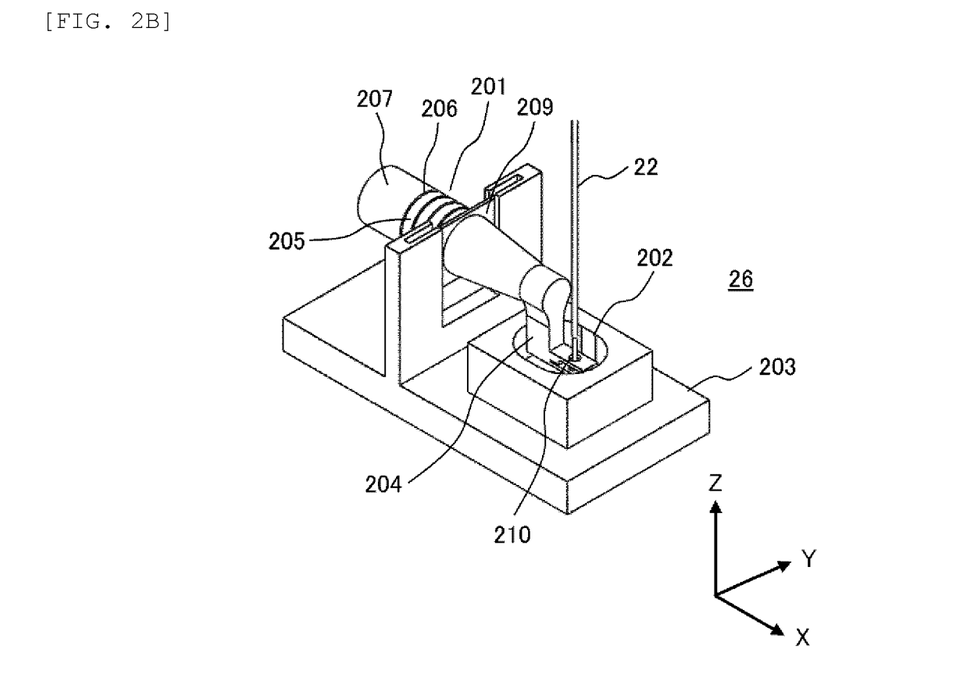
FIG. 2B is a perspective view illustrating the ultrasonic washer 26 described in the first embodiment.
Figure 2C:
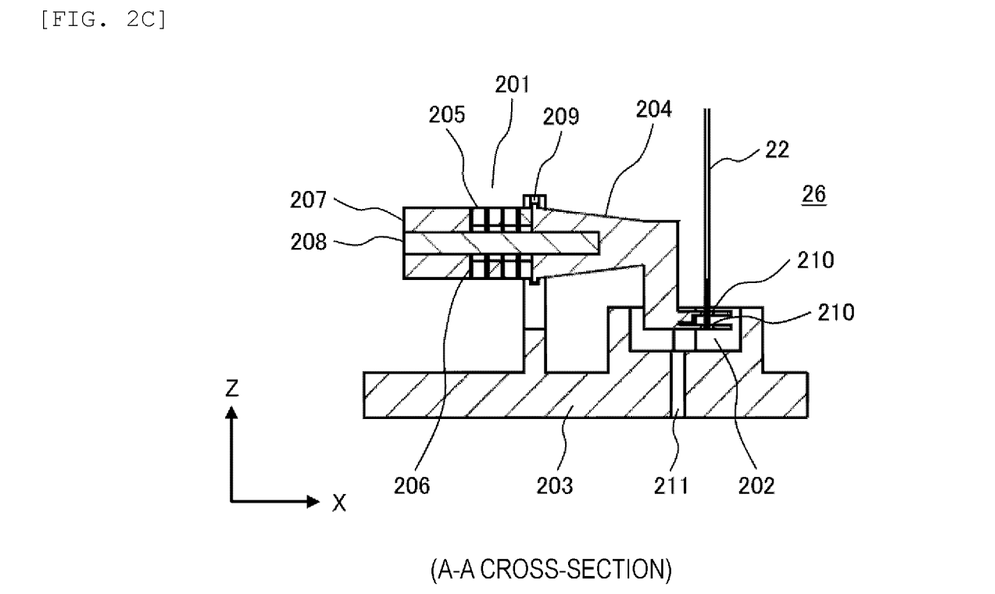
FIG. 2C is a cross-sectional view illustrating the ultrasonic washer 26 described in the first embodiment.
Figure 2D:
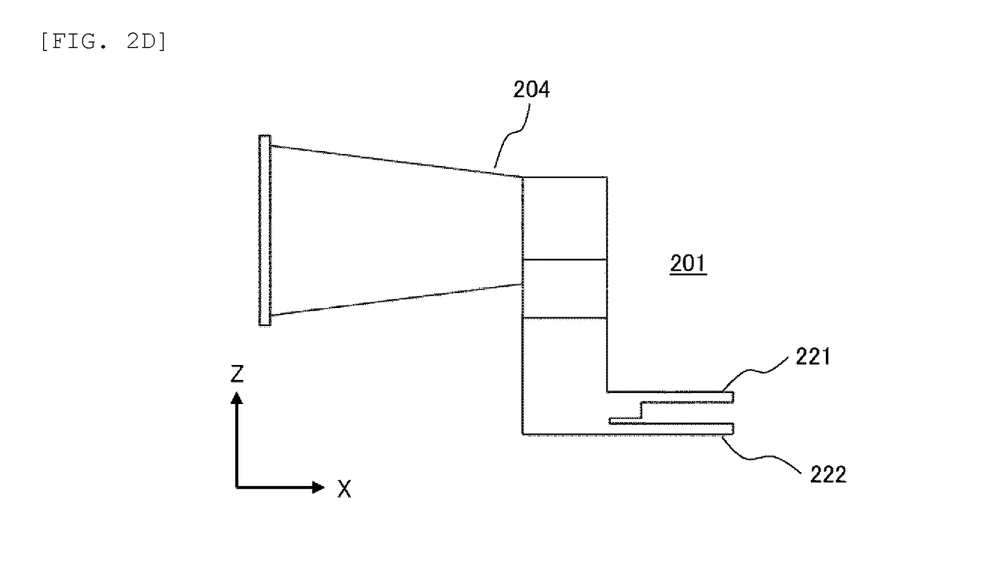
FIG. 2D is an enlarged view of a leading end of an ultrasonic vibrator 201 illustrating the ultrasonic washer 26 described in the first embodiment.

FIGS. 2A, 2B, 2C, and 2D are explanatory diagrams illustrating the ultrasonic washer 26 described in the first embodiment, where FIG. 2A is a top view of the ultrasonic washer 26, FIG. 2B is a perspective view of the ultrasonic washer 26, FIG. 2C is a cross-sectional view of the ultrasonic washer 26 (A-A cross-section in FIG. 2A), and FIG. 2D is an enlarged view of a leading end of the ultrasonic vibrator 201 (front mass 204).

The ultrasonic washer 26 includes an ultrasonic vibrator 201 and a base 203 integrally formed with a washing tank 202 for washing the leading end of the sample nozzle 22 for sucking a sample.

The ultrasonic vibrator 201 includes a front mass (washing head) 204, a plurality of piezoelectric elements 205 (for example, piezoelectric ceramics), a plurality of electrodes 206, and a back mass 207.

Further, a flange 209 for fixing the ultrasonic vibrator 201 to the base 203 is installed on the front mass 204. By inserting the flange 209 on which the ultrasonic vibrator 201 is installed into the slit provided in the base 203, the position of the ultrasonic vibrator 201 in the X and Y directions is fixed.

A hole (washing hole) 210 into which the leading end of the sample nozzle 22 is inserted is formed in the leading end of the front mass 204 (the upper plate 221 and the lower plate 222, which are the diaphragms to be described later). Then, the sample nozzle 22 is lowered toward the washing hole 210 and immersed in the washing liquid stored inside the washing tank 202.

In the first embodiment, the ultrasonic vibrator 201 is installed at an angle close to horizontal (or horizontally) with respect to the liquid surface of the washing liquid filled in the washing tank 202 (the liquid surface of the washing tank 202) so that the angle between the ultrasonic wave irradiation surface of the diaphragm and the liquid surface of the washing tank 202 is nearly parallel (or parallel).

The ultrasonic vibrator 201 is fixed by having the piezoelectric element 205 and the electrode 206 sandwiched between the front mass 204 and the back mass 207 and being bolt-clamped with a bolt 208 in the same manner as a general BLT (Bolt Clamped Langevin Transducer). See FIG. 2C.

Further, a channel 211 is formed in the washing tank 202. The channel 211 is connected to a channel communicating with a washing liquid tank (not shown) and a syringe pump (not shown) installed in the automatic analysis device 10. As a result, the washing liquid is supplied to the washing tank 202 and the washing liquid is recovered from the washing tank 202. See FIG. 2C.

It is also possible to form a groove for receiving the washing liquid outside the washing tank 202, to supply the washing liquid to the washing tank 202, to overflow the washing liquid, and to recover the washing liquid.

Thus, at the leading end of the front mass 204 installed at the leading end of the ultrasonic vibrator 201 described in the first embodiment, two diaphragms of the upper plate 221 and the lower plate 222, which vibrate in opposite phases (driven at frequencies that vibrate in opposite phases), are formed to face each other. See FIG. 2D.

The liquid level of the washing liquid stored inside the washing tank 202 is preferably at least as high as the upper plate 221 or higher. That is, the space between the upper plate 221 and the lower plate 222 needs to be filled with the washing liquid.

The internal size (size and depth) of the washing tank 202 only needs to be that the washing tank 202 does not come into contact with the front mass 204, and that the upper plate 221 and the lower plate 222, which are two diaphragms formed at the leading end of the front mass 204, can be immersed in the washing liquid.

Furthermore, in the first embodiment, the shapes of the upper plate 221 and the lower plate 222, which are the two diaphragms, are changed.

In particular, in the first embodiment, a portion (partially thick portion (shape): thick portion) having a different thickness is formed in a part (root portion) of the upper plate 221, and the difference in mass between the upper plate 221 and the lower plate 222 changes the rigidity of the upper plate 221 and the lower plate 222.

The thick portion is formed in either the upper plate 221 or the lower plate 222, and is formed in the root portion or leading end portion of the diaphragm.

That is, in the first embodiment, the weights of the upper plate 221 and the lower plate 222 are changed in order to change the rigidity of the upper plate 221 and the lower plate 222. In particular, in the first embodiment, the weight of the lower plate 222 is made lighter than the weight of the upper plate 221. Thereby, the upper plate 221 and the lower plate 222 can be vibrated in opposite phases. The weight of the lower plate 222 may be made heavier than the weight of the upper plate 221.

The upper plate 221 and the lower plate 222 are, for example, 4 mm wide, 11 mm long in the longitudinal direction, 1 mm thick, and 2.5 mm thick at the root portion of the upper plate 221. The distance between the upper plate 221 and the lower plate 222 is 2 mm, the diameter of the washing hole 210 is 3 mm, and the longitudinal length of the root portion between the upper plate 221 and the lower plate 222 is 3 mm.

Also, the closer the distance between the upper plate 221 and the lower plate 222 is, the more effective the sound pressure is. Therefore, it is preferable that the distance between the upper plate 221 and the lower plate 222 is about 10 mm at maximum. The range of contact between the sample nozzle 22 and the sample is about several millimeters, and the sample nozzle 22 can be sufficiently washed.

Further, the sample nozzle 22 can be vertically moved by the sample dispensing mechanism 15. Therefore, the sample nozzle 22 can be moved up and down with respect to the region between the upper plate 221 and the lower plate 222 to wash a wide range. For example, first, several millimeters of the leading end portion of the sample nozzle 22 are washed, the sample nozzle 22 is lowered by several millimeters, the next several millimeters are washed, the sample nozzle 22 is lowered by several millimeters again, and then the next several millimeters are washed. By repeating this operation, a wide range can be washed. Alternatively, the sample nozzle 22 may be inserted deeply first, and the washing may be performed while the sample nozzle 22 is raised. Washing can be performed regardless of the moving direction and moving distance of the sample nozzle 22.

Thus, in the automatic analysis device 10 described in the first embodiment, when the sample nozzle 22 is ultrasonically washed in the region between the upper plate 221 and the lower plate 222, ultrasonic washing is performed while changing the height of the sample nozzle 22.

In the first embodiment, in order to change the mass of the upper plate 221 and the mass of the lower plate 222 while using the same material (density) for the upper plate 221 and the lower plate 222, the length, thickness, and amount (forming protrusions and thick portions) are changed. Moreover, in order to change the mass of the upper plate 221 and the mass of the lower plate 222, the upper plate 221 and the lower plate 222 may be made of different materials (density) with the same shape.

In addition, the length, thickness, and amount (forming protrusions and thick portions) may be combined and changed. For example, the thickness and length of the upper plate 221 and the lower plate 222 may be changed. Also, in a shape having different thicknesses and lengths, the widths of the upper plate 221 and the lower plate 222 may be widened. Also, the washing hole 210 may have a shape in which the washing hole 210 is cut open to the leading end instead of being a hole.

In the first embodiment, by changing the rigidity of the upper plate 221 and the lower plate 222, the upper plate 221 and the lower plate 222 can be vibrated in opposite phases.

By vibrating the upper plate 221 and the lower plate 222 in opposite phases, it is possible to generate a region where the sound pressure is concentrated (amplified) in the region (hollow portion) between the upper plate 221 and the lower plate 222. That is, by vibrating the upper plate 221 and the lower plate 222 in opposite phases, it is possible to radiate ultrasonic waves in the same phase to the hollow portion, and by radiating the ultrasonic waves in the same phase, it is possible to generate a region where the sound pressure is concentrated.

As described above, according to the first embodiment, by radiating ultrasonic waves in the same phase from a plurality of vibration surfaces (two planes), it is possible to generate a region where sound pressure is concentrated (a region where sound pressure is increased).

A good washing effect can be obtained by inserting the leading end of the sample nozzle 22 into the region where the sound pressure is concentrated.

As described above, the ultrasonic washer 26 described in the first embodiment has the ultrasonic vibrator 201, and the washing head (front mass 204) is installed at the leading end of the ultrasonic vibrator 201, and at the leading end (end portion) of the washing head (the front mass 204), there are the upper plate 221 and the lower plate 222 which serve as diaphragms and have different rigidity. As a material for the diaphragm, for example, a chemical-resistant SUS material that can be used with an alkaline detergent is used.

By changing the length, thickness, and mass of the upper plate 221 and the lower plate 222, the rigidity of the upper plate 221 and the lower plate 222 is changed.

As described above, according to the first embodiment, the automatic analysis device 10 having the ultrasonic washer 26 having a high washing effect can be provided in which cavitation through ultrasonic vibration is effectively generated around the sample nozzle 22, and the washing effect of effectively washing contaminants adhering to the leading end of the sample nozzle 22 is achieved.

Figure 3A:
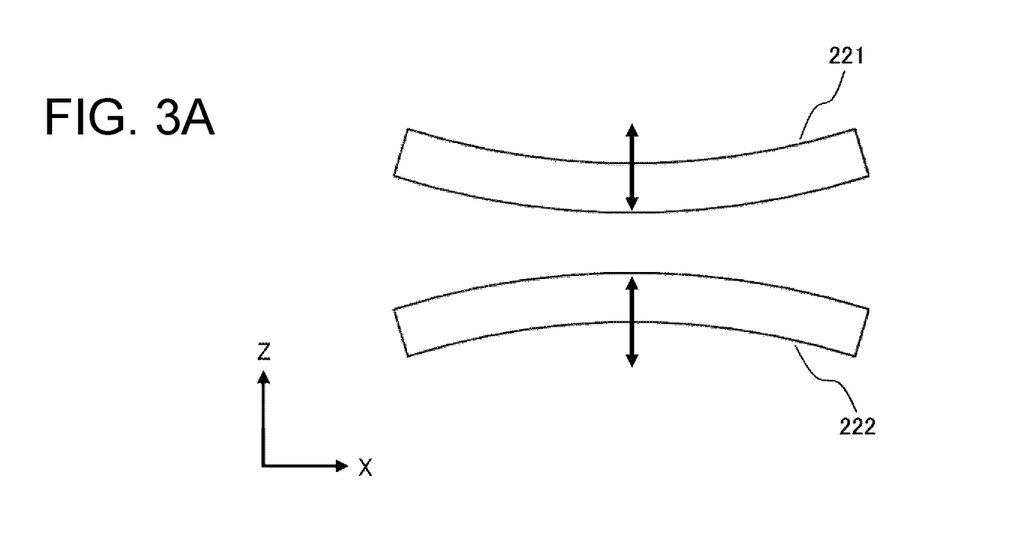
FIGS. 3A and 3B are explanatory diagrams illustrating a vibration direction FIG. 3A and a sound pressure distribution FIG. 3B when the leading ends (two diaphragms) of a front mass 204 described in the first embodiment vibrate.
Figure 3B:
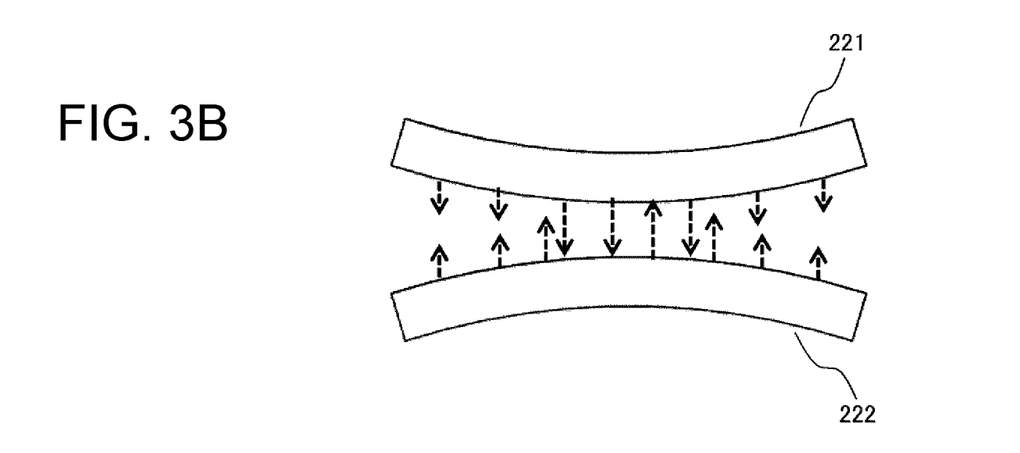

Here, the vibration direction (a) and the sound pressure distribution (b) when the leading end (two diaphragms) of the front mass 204 vibrates will be described.

FIG. 3A is an explanatory diagram illustrating the vibration direction (a) and the sound pressure distribution (b) when the leading end (two diaphragms) of the front mass 204 described in the first embodiment vibrates.

Figure 3C:
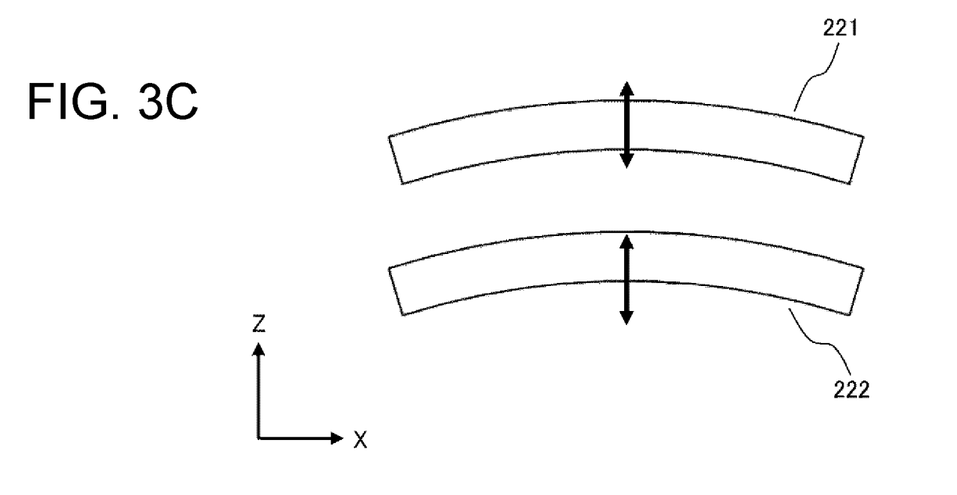
FIGS. 3C and 3D are explanatory diagrams illustrating the vibration direction FIG. 3C and the sound pressure distribution FIG. 3D when the leading ends (two diaphragms) of the front mass 204 described in a comparative example vibrate.
Figure 3D:
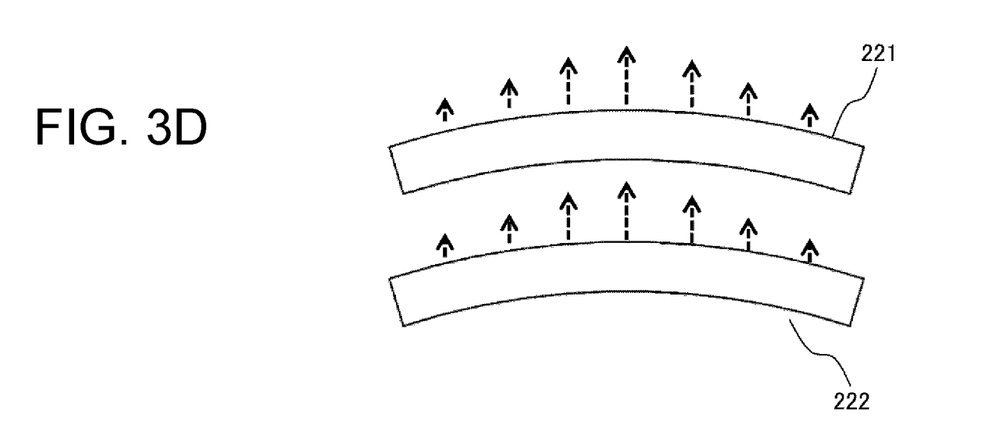

FIG. 3B is an explanatory diagram illustrating the vibration direction (a) and the sound pressure distribution (b) when the leading end (two diaphragms) of the front mass 204 described in the comparative example vibrates.

When the front mass 204 is vibrated, the upper plate 221 and the lower plate 222, which are two diaphragms formed at the leading end of the front mass 204, vibrate in opposite phases or in the same phase.

FIG. 3A(a) shows the deformed shapes of the upper plate 221 and the lower plate 222 when vibrating in opposite phases, and FIG. 3B(a) shows the deformed shapes of the upper plate 221 and the lower plate 222 when vibrating in the same phase.

As shown in FIG. 3A(a), in opposite phases, the upper plate 221 and the lower plate 222 vibrate in opposite directions. Therefore, when the upper plate 221 deforms downward (−Z direction), the lower plate 222 deforms upward (+Z direction), and when the upper plate 221 deforms upward (+Z direction), the lower plate 222 deforms downward (−Z direction).

On the other hand, as shown in FIG. 3B(a), in the same phase, the upper plate 221 and the lower plate 222 vibrate in the same direction. Therefore, when the upper plate 221 deforms upward (+Z direction), the lower plate 222 also deforms upward (+Z direction), and when the upper plate 221 deforms downward (−Z direction), the lower plate 222 also deforms downward (−Z direction).

FIG. 3A(b) shows the phase (sound pressure distribution) of ultrasonic waves generated when the upper plate 221 and the lower plate 222 vibrate in opposite phases, and FIG. 3B(b) shows the phase (sound pressure distribution) of ultrasonic waves generated when the upper plate 221 and the lower plate 222 vibrate in the same phase.

As shown in FIG. 3A(b), when the upper plate 221 and the lower plate 222 are driven at frequencies that vibrate in opposite phases, the vibrations of ultrasonic waves generated in the region (hollow portion) between the upper plate 221 and the lower plate 222 have the same phase and act in the direction of increasing the sound pressure.

On the other hand, as shown in FIG. 3B(b), when the upper plate 221 and the lower plate 222 are driven at frequencies that vibrate in the same phase, the vibrations of ultrasonic waves generated in the region (hollow portion) between the upper plate 221 and the lower plate 222 have opposite phases and act in the direction of weakening the sound pressure (the direction in which the ultrasonic waves cancel each other (the sound pressure is canceled)).

As described above, according to the first embodiment, the upper plate 221 and the lower plate 222 are vibrated in opposite phases, and the hollow portion is irradiated with ultrasonic waves in the same phase, so that a region where the sound pressure is concentrated (a region where the sound pressure increases (strengthens)) can be generated in the hollow portion, and cavitation through ultrasonic vibration can be effectively generated around the sample nozzle 22.

In the first embodiment, the diaphragm uses the secondary vibration mode (displacement near the center is large) in order to increase the sound pressure in the region where the washing hole 210 is located near the center of the diaphragm.

The diaphragm can also use a primary vibration mode (displacement on the leading end side is large).

In this case, since a region where the sound pressure is increased is generated on the leading end side where the displacement is large, it is preferable to form the washing hole 210 into which the sample nozzle 22 is inserted on the leading end side of the diaphragm.

However, in order to excite the primary vibration mode in the frequency band of 20 kHz or higher used in ultrasonic washing, the rigidity needs to be increased by shortening the length of the diaphragm or increasing the thickness of the diaphragm. In this case, if the length of the diaphragm is shortened, the region irradiated with the ultrasonic waves becomes narrower, and if the thickness of the diaphragm is increased, the depth of the washing tank 202 increases.

Therefore, it is preferable that the vibrations of the upper plate 221 and the lower plate 222 become in a state close to opposite phases by forming the washing hole 210 near the center of the diaphragm and using the secondary vibration mode in which the displacement near the center of the diaphragm is maximum.

That is, it is preferable that the upper plate 221 and the lower plate 222 have the maximum amplitude near the position where the sample nozzle 22 is inserted (the position where the washing hole 210 is formed).

Figure 4A:
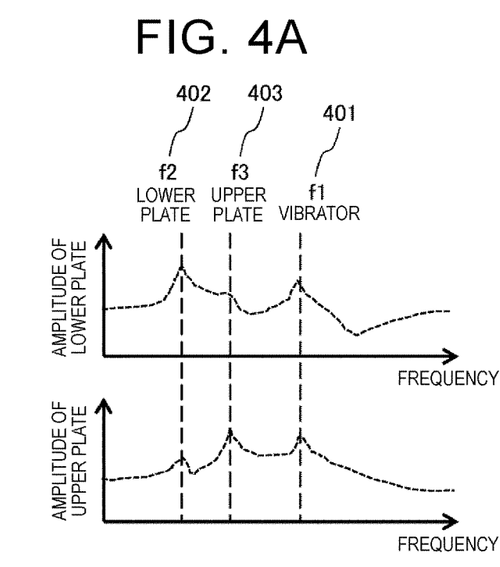
Figure 4B:
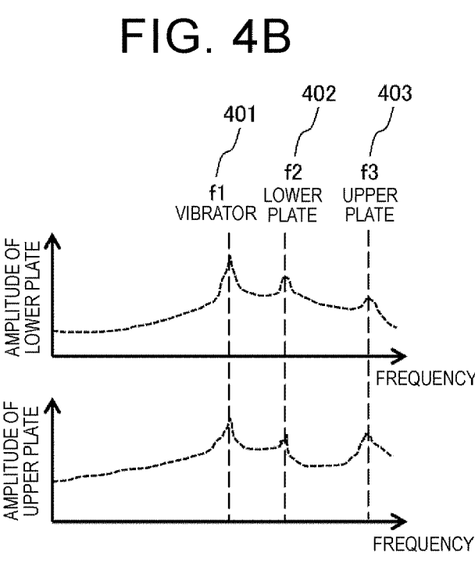
Figure 4C:
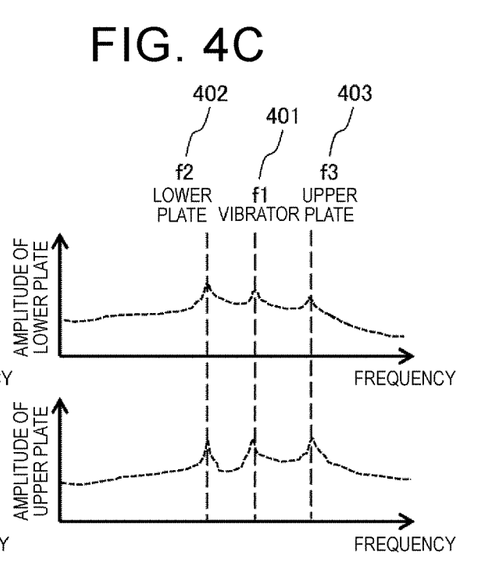

Next, the frequency response of the ultrasonic vibrator 201 and the two diaphragms (the upper plate 221 and the lower plate 222) will be described.

FIG. 4 is an explanatory diagram illustrating the frequency response of the ultrasonic vibrator 201 and the two diaphragms, where (a) shows when the resonance frequency of the ultrasonic vibrator 201 is the highest, (b) shows when the resonance frequency of the ultrasonic vibrator 201 is the lowest, and (c) shows the relationship between the resonance frequency of the ultrasonic vibrator 201 described in the first embodiment and the resonance frequencies of the two diaphragms.

The ultrasonic vibrator 201 has a resonance frequency f1 (401) at which the piezoelectric element 205 expands and contracts greatly in the X direction. The resonance frequency f1 (401) is determined by the length of the ultrasonic vibrator 201 in the X direction and the speed of sound of the front mass 204, the back mass 207, and the piezoelectric element 205.

The resonance frequency f2 (402) of the upper plate 221 and the resonance frequency f3 (403) of the lower plate 222, at which the upper plate 221 and the lower plate 222 are greatly deformed in the Z direction as shown in FIG. 3, are determined by the rigidity such as the thickness and length of the upper plate 221 and the rigidity such as the thickness and length of the lower plate 222.

The resonance frequency f1 (401) at which the ultrasonic vibrator 201 expands and contracts changes only about several kHz even when the shape of the upper plate 221 and the shape of the lower plate 222 are changed.

The setting patterns of the resonance frequencies of f1, f2, and f3 include the order of f2, f3, and f1 as shown in FIG. 4(a), the order of f1, f2, and f3 as shown in FIG. 4(b), and the order of f2, f1, and f3 as shown in FIG. 4(c). The order of f2 and f3 may be reversed.

That is, FIG. 4(a) shows f2 and f3 lower than f1, FIG. 4(b) shows f2 and f3 higher than f1, and FIG. 4(c) shows f1 between f2 and f3.

In such a setting pattern of the resonance frequency, when the drive frequency of the ultrasonic vibrator 201 (frequency for driving the ultrasonic vibrator 201) is around f1, the condition for vibrating the upper plate 221 and the lower plate 222 in opposite phases is only when f1 (drive frequency) is between f2 and f3, as shown in FIG. 4(c). That is, the drive frequency (resonance frequency f1) is between a certain resonance frequency (f2 or f3) at which the deformation of the diaphragm becomes large and another resonance frequency (f3 or f2) at which the deformation of the diaphragm becomes large.

The difference in rigidity between the upper plate 221 and the upper plate 222 can be designed by adjusting the difference in length, the difference in thickness, and partial changes in thickness (protrusions and thick portions). That is, the frequency difference between f2 (402) and f3 (403) can be set.

Thus, by setting the resonance frequency f2 of the upper plate 221 and the resonance frequency f3 of the lower plate 222 around the resonance frequency f1 at which the ultrasonic vibrator 201 expands and contracts, and setting the drive frequency to the resonance frequency f1, the vibration phases of the upper plate 221 and the lower plate 222 are opposite to each other. Thus, ultrasonic waves with the same phase are generated between the two diaphragms that vibrate in opposite phases to increase the sound pressure and obtain a good washing effect.

Furthermore, in order to amplify the amplitude of the upper plate 221 and the lower plate 222 with opposite-phase vibration, f2 and f3 are preferably close to f1, and f2 and f3 are each preferably within about 5 kHz from f1. For example, if f1 is 40 kHz, f2 is set to 35 kHz and f3 is set to 45 kHz. f2 and f3 may be reversed.

That is, it is preferable to set the drive frequency (near f1) between f2 and f3, and set f2 and f3 close to f1 (f2 and f3 are each within about 5 kHz from f1). Thus, the frequency difference between f2 and f3 is preferably within 10 kHz.

By setting the drive frequency in this manner, the upper plate 221 and the lower plate 222 can be vibrated in opposite phases, and the amplitudes of both the upper plate 221 and the lower plate 222 can be amplified.

Even when the drive frequency is set to a frequency band other than around f1, there are conditions under which the upper plate 221 and the lower plate 222 vibrate in opposite phases. However, in this case, the amplitude of the upper plate 221 or the lower plate 222 may decrease compared to the case where the drive frequency is in the frequency band around f1. Therefore, it is preferable to set the drive frequency to a frequency band near f1.

Even when the drive frequency is set to a frequency band other than around f1, as long as the upper plate 221 and the lower plate 222 vibrate in opposite phases, it is possible to generate a region where sound pressure is concentrated.

As described above, the ultrasonic vibrator 201 has three characteristic resonance frequencies. One is the frequency at which the amplitude is amplified by axial expansion and contraction of the ultrasonic vibrator 201 (referred to as the vibrator expansion and contraction frequency) and the remaining two are frequencies at which the amplitude in the direction perpendicular to the surfaces of the upper plate 221 and the lower plate 222 is amplified (referred to as the upper plate frequency and the lower plate frequency).

According to the first embodiment, the ultrasonic vibrator 201 sets the vibrator expansion and contraction frequency between the upper plate frequency and the lower plate frequency, and drives the ultrasonic vibrator 201 at the vibrator expansion and contraction frequency during nozzle washing, whereby the two diaphragms can be vibrated in opposite phases.

The automatic analysis device 10 also includes a drive controller (not shown) for driving the ultrasonic washer 26. The drive controller inputs a sinusoidal voltage of, for example, 20 kHz or more to the ultrasonic vibrator 201 to ultrasonically vibrate the diaphragms (the upper plate 221 and the lower plate 222).

Thus, the vibration phases of the upper plate 221 and the lower plate 222 are opposite phases that are reversed by about 180 degrees, and the ultrasonic washer 26 generates cavitation in a region between the two diaphragms to wash the sample nozzle 22.

The drive control unit has an automatic follow-up function that automatically follows the resonance frequency f1 of the ultrasonic vibrator 201, and sets the drive frequency to the resonance frequency f1. In general, the resonance frequency of the ultrasonic vibrator 201 has a high Q value (sharpness), and if the drive frequency deviates from the resonance frequency f1, the amplitude of the ultrasonic vibrator 201 may decrease. Therefore, it is preferable to set the drive frequency to the resonance frequency f1 with the lowest impedance (high drive current). In other words, the drive frequency is preferably the resonance frequency at which the displacement when the ultrasonic vibrator 201 expands and contracts is maximized.

Moreover, in the first embodiment, two diaphragms are used which are easy to design and manufacture. Three or more diaphragms can also be used. The sample nozzle 22 can be washed by vibrating the opposing diaphragms in opposite phases and inserting the sample nozzle 22 into the region between the diaphragms.

In addition, in the automatic analysis device 10, the installation position of the ultrasonic washer 26 may be any place in the automatic analysis device 10, and the ultrasonic washer 26 may be installed only when moving to the washing position or when washing the nozzle.

Further, in the first embodiment, the nozzle to be washed is the sample nozzle 22. The nozzle to be washed is not limited to the sample nozzle 22, and the reagent nozzle 21 may also be used.

Second Embodiment

Figure 5A:
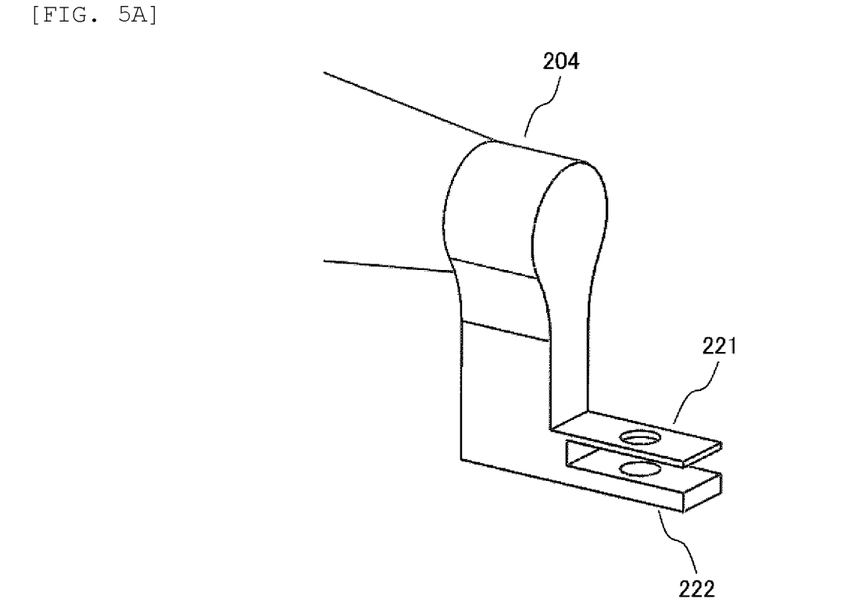
FIG. 5A is an explanatory diagram illustrating a leading end shape of the ultrasonic vibrator 201 described in a second embodiment.

Next, the leading end shape of the ultrasonic vibrator 201 described in a second embodiment will be described.

FIG. 5A is an explanatory diagram illustrating the leading end shape of the ultrasonic vibrator 201 described in the second embodiment.

Two diaphragms of the upper plate 221 and the lower plate 222 formed at the leading end of the front mass 204 installed at the leading end of the ultrasonic vibrator 201 described in the second embodiment have a shape different from that of the two diaphragms described in the first embodiment. Other parts are the same as in the first embodiment.

That is, in the second embodiment, the thicknesses of the upper plate 221 and the lower plate 222 are changed in order to change the rigidity of the upper plate 221 and the lower plate 222. In particular, in the second embodiment, the thickness of the lower plate 222 is made thicker than the thickness of the upper plate 221. Thereby, the upper plate 221 and the lower plate 222 can be vibrated in opposite phases. The thickness of the lower plate 222 may be thinner than the thickness of the upper plate 221.

Third Embodiment

Figure 5B:
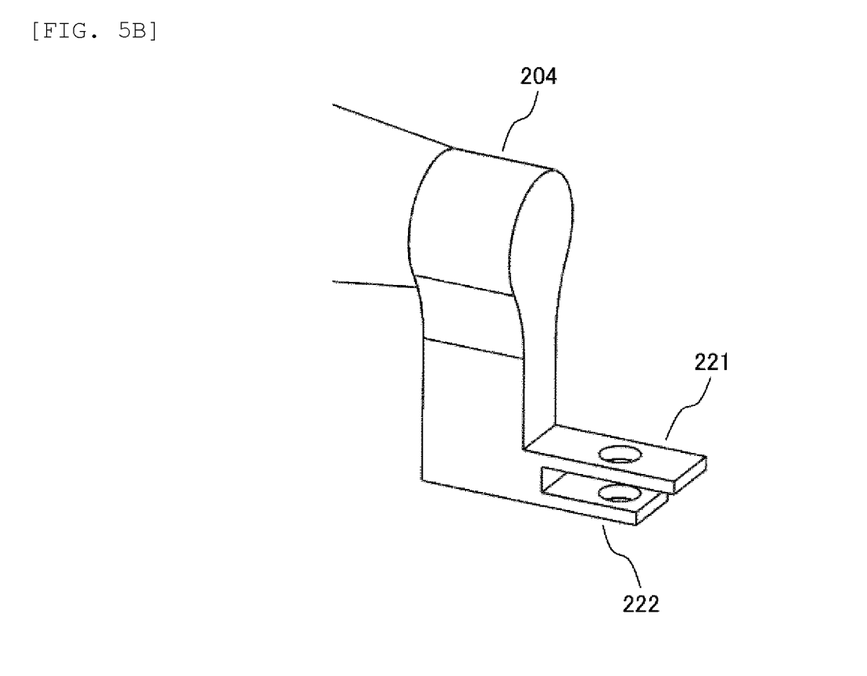
FIG. 5B is an explanatory diagram illustrating a leading end shape of the ultrasonic vibrator 201 described in a third embodiment.

Next, the leading end shape of the ultrasonic vibrator 201 described in a third embodiment will be described.

FIG. 5B is an explanatory diagram illustrating the leading end shape of the ultrasonic vibrator 201 described in the third embodiment.

Two diaphragms of the upper plate 221 and the lower plate 222 formed at the leading end of the front mass 204 installed at the leading end of the ultrasonic vibrator 201 described in the third embodiment also have a shape different from that of the two diaphragms described in the first embodiment. Other parts are the same as in the first embodiment.

That is, in the third embodiment, the lengths of the upper plate 221 and the lower plate 222 are changed in order to change the rigidity of the upper plate 221 and the lower plate 222. In particular, in the third embodiment, the length of the lower plate 222 is made shorter than the length of the upper plate 221. Thereby, the upper plate 221 and the lower plate 222 can be vibrated in opposite phases. The length of the lower plate 222 may be longer than the length of the upper plate 221.

Fourth Embodiment

Figure 5C:
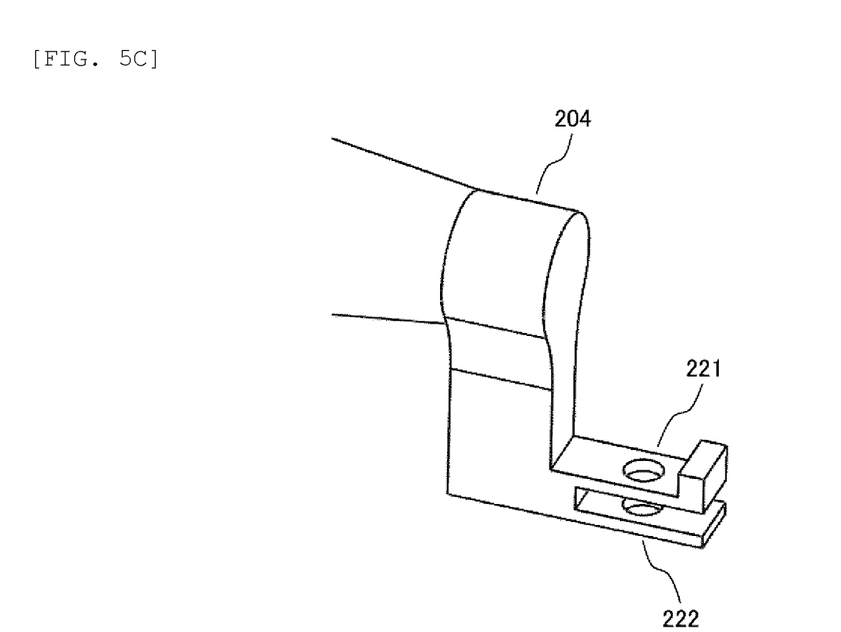
FIG. 5C is an explanatory diagram illustrating a leading end shape of the ultrasonic vibrator 201 described in a fourth embodiment.

Next, the leading end shape of the ultrasonic vibrator 201 described in a fourth embodiment will be described.

FIG. 5C is an explanatory diagram illustrating the leading end shape of the ultrasonic vibrator 201 described in the fourth embodiment.

Two diaphragms of the upper plate 221 and the lower plate 222 formed at the leading end of the front mass 204 installed at the leading end of the ultrasonic vibrator 201 described in the fourth embodiment also have a shape different from that of the two diaphragms described the first embodiment. Other parts are the same as in the first embodiment.

That is, in the fourth embodiment, the weights of the upper plate 221 and the lower plate 222 are changed in order to change the rigidity of the upper plate 221 and the lower plate 222. In particular, in the fourth embodiment, the weight of the lower plate 222 is made lighter than the weight of the upper plate 221. Thereby, the upper plate 221 and the lower plate 222 can be vibrated in opposite phases. The weight of the lower plate 222 may be made heavier than the weight of the upper plate 221.

In particular, in the fourth embodiment, a portion with a different thickness (portion with a thicker thickness: protrusion) is formed in a part (leading end portion) of the upper plate 221 and the rigidity of the upper plate 221 and the lower plate 222 is changed.

Fifth Embodiment

Figure 5D:
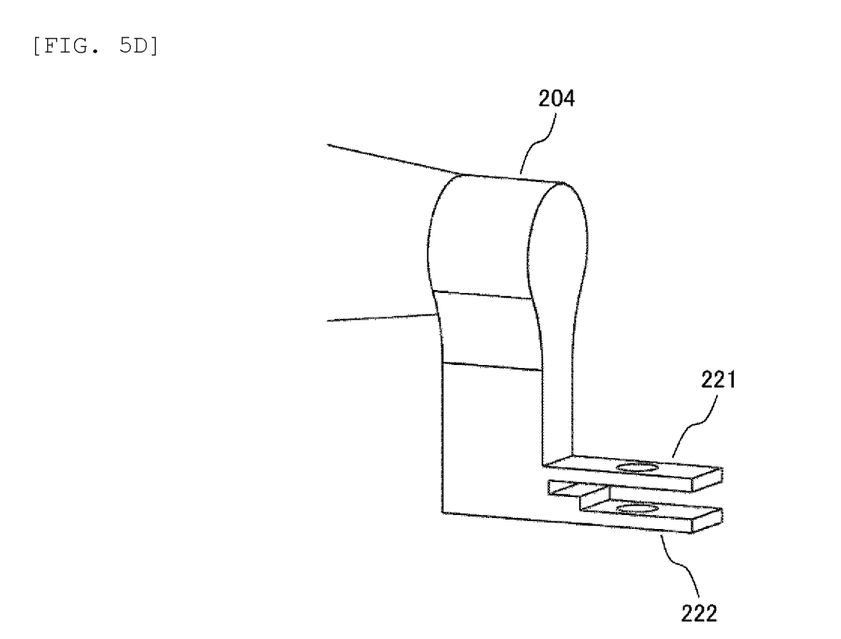
FIG. 5D is an explanatory diagram illustrating a leading end shape of the ultrasonic vibrator 201 described in a fifth embodiment.

Next, the leading end shape of the ultrasonic vibrator 201 described in a fifth embodiment will be described.

FIG. 5D is an explanatory diagram illustrating the leading end shape of the ultrasonic vibrator 201 described in the fifth embodiment.

The two diaphragms of the upper plate 221 and the lower plate 222 formed at the leading end of the front mass 204 installed at the leading end of the ultrasonic vibrator 201 described in the fifth embodiment also have a shape different from that of the two diaphragms described in the first embodiment. Other parts are the same as in the first embodiment.

That is, in the fifth embodiment, the weights of the upper plate 221 and the lower plate 222 are changed in order to change the rigidity of the upper plate 221 and the lower plate 222. In particular, in the fifth embodiment, the weight of the lower plate 222 is made heavier than the weight of the upper plate 221. Thereby, the upper plate 221 and the lower plate 222 can be vibrated in opposite phases. The weight of the lower plate 222 may be lighter than the weight of the upper plate 221.

In particular, in the fifth embodiment, a portion with a different thickness (portion with a thicker thickness: thick portion) is formed in a part (root portion) of the lower plate 222, and the rigidity of the upper plate 221 and the lower plate 222 is changed.

Sixth Embodiment

Figure 5E:
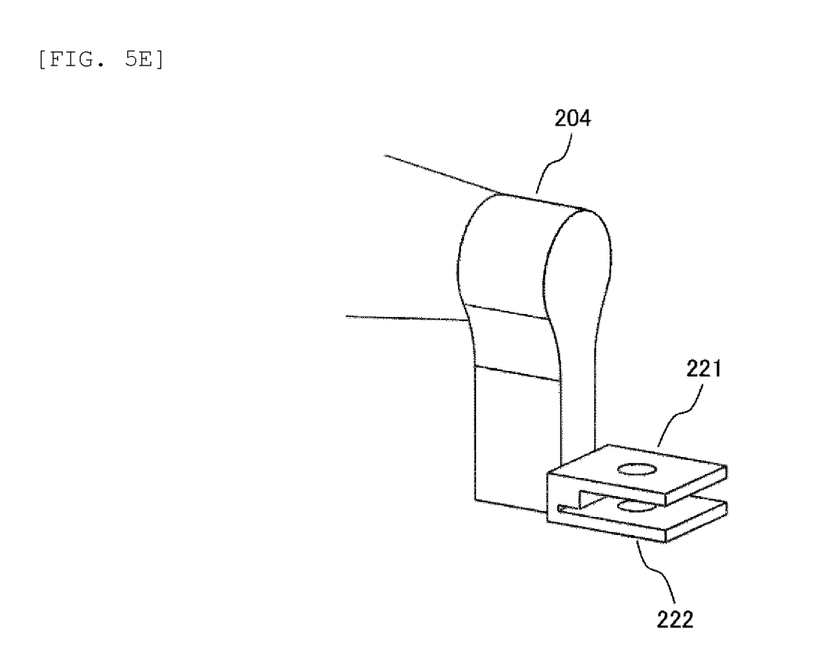
FIG. 5E is an explanatory diagram illustrating a leading end shape of the ultrasonic vibrator 201 described in a sixth embodiment.

Next, the leading end shape of the ultrasonic vibrator 201 described in a sixth embodiment will be described.

FIG. 5E is an explanatory diagram illustrating the leading end shape of the ultrasonic vibrator 201 described in the sixth embodiment.

The two diaphragms of the upper plate 221 and the lower plate 222 formed at the leading end of the front mass 204 installed at the leading end of the ultrasonic vibrator 201 described in the sixth embodiment also have a shape different from that of the two diaphragms described in the first embodiment. Other parts are the same as in the first embodiment.

That is, in the sixth embodiment, in order to change the rigidity of the upper plate 221 and the lower plate 222, the weights of the upper plate 221 and the lower plate 222 are changed, and the widths of the upper plate 221 and the lower plate 222 are widened compared to the first embodiment. In particular, in the sixth embodiment, the weight of the upper plate 221 is made heavier than the weight of the lower plate 222 as in the first embodiment. Thereby, the upper plate 221 and the lower plate 222 can be vibrated in opposite phases. The weight of the upper plate 221 may be lighter than the weight of the lower plate 222.

In particular, in the sixth embodiment, the widths of the upper plate 221 and the lower plate 222 are widened, and a portion with a different thickness (portion with a thicker thickness: thick portion) is formed in a part (root portion) of the upper plate 221, and the rigidity of the upper plate 221 and the lower plate 222 is changed.

The width of the upper plate 221 and the lower plate 222 is, for example, 6 mm (4 mm in the first embodiment). Other parts are the same as in the first embodiment.

Thus, in the sixth embodiment, the widths of the diaphragms (the widths of the upper plate 221 and the lower plate 222) are preferably wider than the width of the base of the front mass 204 on which the diaphragms are installed.

In addition, the sound pressure concentration effect due to the opposite phase is preferable because the area of ultrasonic wave irradiation increases as the area between the upper plate 221 and the lower plate 222 increases.

Seventh Embodiment

Figure 5F:
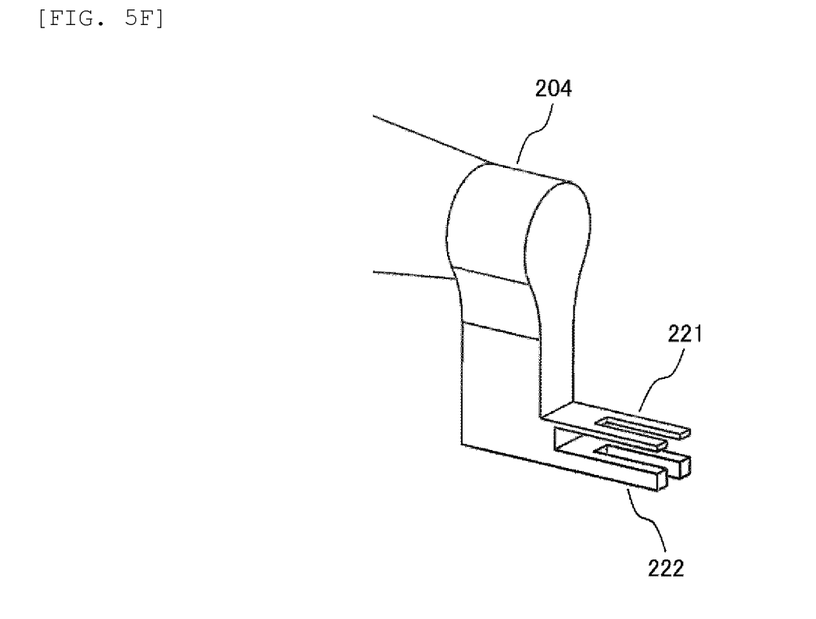
FIG. 5F is an explanatory diagram illustrating a leading end shape of the ultrasonic vibrator 201 described in a seventh embodiment.

Next, the leading end shape of the ultrasonic vibrator 201 described in a seventh embodiment will be described.

FIG. 5F is an explanatory diagram illustrating the leading end shape of the ultrasonic vibrator 201 described in the seventh embodiment.

Two diaphragms of the upper plate 221 and the lower plate 222 formed at the leading end of the front mass 204 installed at the leading end of the ultrasonic vibrator 201 described in the seventh embodiment also have a shape different from that of the two diaphragms described in the first embodiment. Other parts are the same as in the first embodiment.

That is, in the seventh embodiment, in order to change the rigidity of the upper plate 221 and the lower plate 222, the thicknesses of the upper plate 221 and the lower plate 222 are changed, and the washing hole 210 into which the sample nozzle 22 is inserted is cut open to the leading end. In particular, in the seventh embodiment, the thickness of the lower plate 222 is made thicker than the thickness of the upper plate 221 as in the second embodiment. Thereby, the upper plate 221 and the lower plate 222 can be vibrated in opposite phases. The thickness of the lower plate 222 may be thinner than the thickness of the upper plate 221.

Eighth Embodiment

Figure 6A:
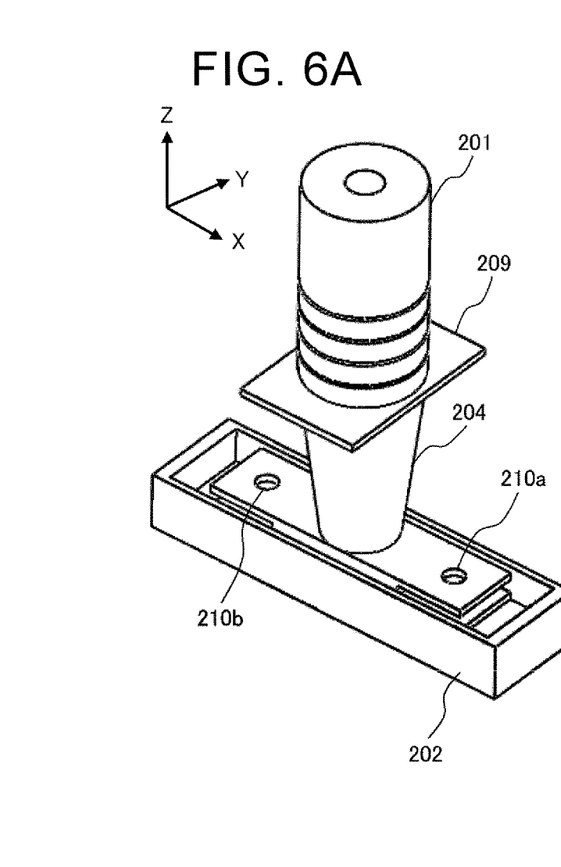
Figure 6B:
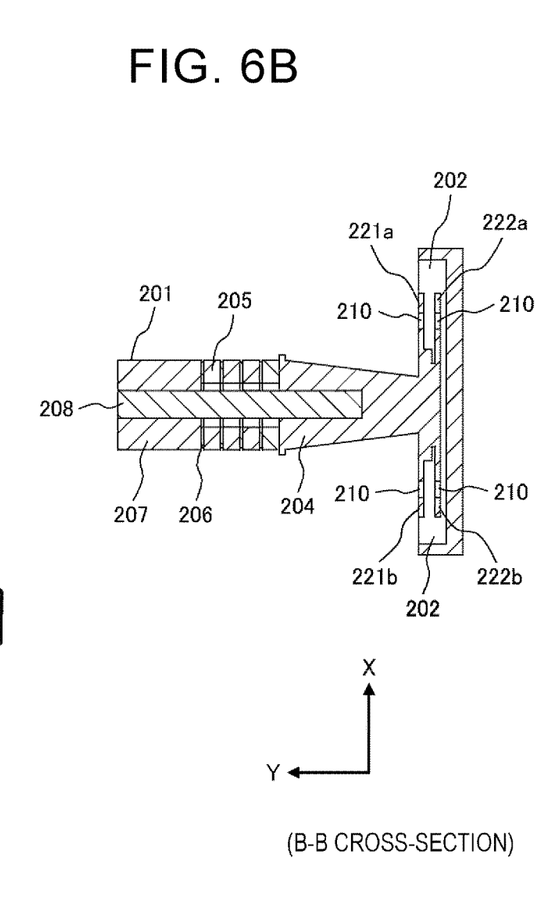
Figure 6C:
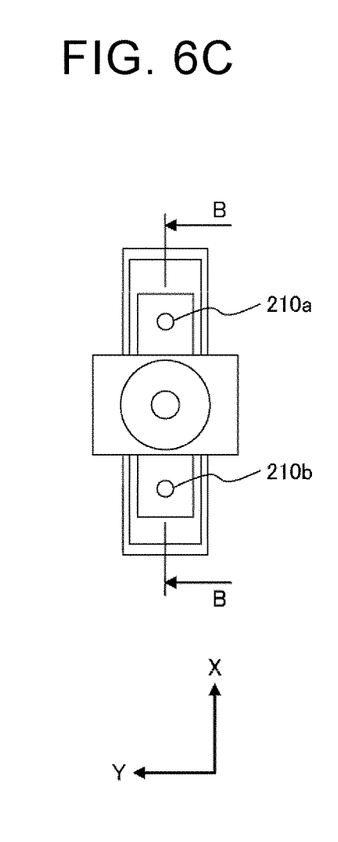

Next, the ultrasonic washer 26 described in an eighth embodiment will be described.

FIG. 6 is an explanatory diagram illustrating the ultrasonic washer 26 described in the eighth embodiment, where (a) is a perspective view of the ultrasonic washer 26, (b) is a cross-sectional view of the ultrasonic washer 26 (B-B cross section of (c)), and (c) is a top view of the ultrasonic washer 26.

The ultrasonic washer 26 described in the eighth embodiment differs from the ultrasonic washer 26 described in the first embodiment in the shape of the front mass 204 and the installation direction of the front mass 204.

In the first embodiment, the ultrasonic vibrator 201 is installed at an angle close to horizontal with respect to the liquid surface of the washing tank 202. On the other hand, in the eighth embodiment, the ultrasonic vibrator 201 is installed at an angle close to vertical (or vertical) with respect to the liquid surface of the washing tank 202.

That is, in the eighth embodiment, the upper plate 221 and the lower plate 222, which are two diaphragms formed at the leading end of the front mass 204, are installed so as to be orthogonal to the main body of the front mass 204.

In addition, in the eighth embodiment, two diaphragms are installed on the left and right (at two locations) with respect to the main body of the front mass 204. Two diaphragms installed at two locations are immersed in the washing liquid stored inside the washing tank 202.

The ultrasonic vibrator 201 is fixed by inserting the flange 209 into a slit provided in the base (not shown), as in the first embodiment.

The front mass 204 has two upper plates 221 and two lower plates 222, for a total of four diaphragms. Then, an upper plate 221a and a lower plate 222a, and an upper plate 221b and a lower plate 222b form pairs, respectively, and each pair forms a region for increasing the sound pressure. The upper plate 221a and the lower plate 222a, and the upper plate 221b and the lower plate 222b are driven at frequencies that vibrate in opposite phases, as in the first embodiment.

Further, by forming the upper plate 221a and the lower plate 222a, and the upper plate 221b and the lower plate 222b symmetrically with respect to the central axis (Z-axis) of the ultrasonic vibrator 201, in the deformation of the diaphragm through the vibration in the Z-axis direction of the ultrasonic vibrator 201, the vibration between the upper plate 221a and the lower plate 222a and the vibration between the upper plate 221b and the lower plate 222b are approximately the same.

When washing the sample nozzle 22, the sample nozzle 22 is inserted into one of the two washing holes 210a and 210b. Two sample nozzles 22 can also be washed at the same time.

In addition, in the eighth embodiment, two pairs of diaphragms (two washing holes 210a and 210b) are used. As in the first embodiment, a pair of diaphragms (one washing hole 210) may be used.

For example, it is a shape in which the upper plate 221b and the lower plate 222b are removed and one pair of diaphragms is absent.

Further, when two pairs of diaphragms are installed and one pair of diaphragms is used, one diaphragm may be shaped like a plate (for example, the washing hole 210b is closed), or one diaphragm may be shaped like a block (the region between the upper plate 221b and the lower plate 222b is closed).

Also, in the eighth embodiment, the number of pairs of diaphragms and the installation angle of the main body of the front mass 204 can be changed.

As described above, even in the eighth embodiment, it is possible to radiate ultrasonic waves from a plurality of vibration surfaces, radiate ultrasonic waves in the same phase, and effectively generate cavitation around the sample nozzle 22 through ultrasonic vibrations.

In addition, the present invention is not limited to the above-described embodiments and includes various modifications. For example, the above-described embodiments are specifically described in order to describe the present invention in an easy-to-understand manner and are not necessarily limited to those having all the configurations described.

Also, a part of the configuration of one embodiment can be replaced with a part of the configuration of another embodiment. Also, the configuration of another embodiment can be added to the configuration of one embodiment. Also, a part of the configuration of each embodiment can be deleted, a part of another configuration can be added, and a part of another configuration can be replaced.

REFERENCE SIGNS LIST

10: automatic analysis device
11: reagent container
12: reagent disk
13: reaction disk
14: reagent dispensing mechanism
15: sample dispensing mechanism
21: reagent nozzle
22: sample nozzle
23: sample container
24: sample rack
25: cell
26: ultrasonic washer
201: ultrasonic vibrator
202: washing tank
203: base
204: front mass
205: piezoelectric element
206: electrode
207: back mass
208: volt
209: flange
210, 210a, 210b: washing hole
211: channel
221, 221a, 221b: upper plate
222, 222a, 222b: lower plate
401: resonance frequency f1
402: resonance frequency f2
403: resonance frequency f3

The invention claimed is:

1. An ultrasonic washer comprising:
a washing tank for washing a nozzle for sucking a sample or a reagent; and
an ultrasonic vibrator in which a piezoelectric element is sandwiched between a front mass and a back mass, wherein
diaphragms of an upper plate and a lower plate facing each other are formed at a leading end of the front mass installed at a leading end of the ultrasonic vibrator,
the nozzle is ultrasonically washed in a region between the upper plate and the lower plate, and
a drive frequency controller to generate a drive frequency of the ultrasonic vibrator is set between the resonance frequency of the upper plate and the resonance frequency of the lower plate.

2. The ultrasonic washer according to claim 1, wherein the ultrasonic vibrator is installed at an angle approximately horizontal and installed so that the angle between ultrasonic irradiation surfaces of the diaphragms and a liquid level of a washing liquid filled in the washing tank are approximately parallel to each other.

3. The ultrasonic washer according to claim 1, wherein the diaphragms of the upper plate and the lower plate are different in length or thickness.

4. The ultrasonic washer according to claim 1, wherein the diaphragms of the upper plate and the lower plate are driven at frequencies that vibrate in opposite phases.

5. The ultrasonic washer according to claim 4, wherein a drive frequency of the ultrasonic vibrator is a resonance frequency at which displacement of the diaphragms of the upper plate and lower pate is maximized.

6. The ultrasonic washer according to claim 1, wherein the upper plate or the lower plate has a shape that is partially thick.

7. The ultrasonic washer according to claim 1, wherein a difference in frequency between the resonance frequency of the upper plate and the resonance frequency of the lower plate is within 10 kHz.

8. The ultrasonic washer according to claim 4, wherein the upper plate or the lower plate has a maximum amplitude approximately at a position where the nozzle is inserted.

9. The ultrasonic washer according to claim 4, wherein a width of at least one of the diaphragms is wider than a width of a base of the front mass on which the diaphragm is installed.

10. An automatic analysis device characterized by comprising the ultrasonic washer according to claim 1.

11. The automatic analysis device according to claim 10, wherein
the ultrasonic washing is performed while changing a height of the nozzle when the nozzle is ultrasonically washed in a region between the upper plate and the lower plate.

* * * * *